Patented June 22, 1943

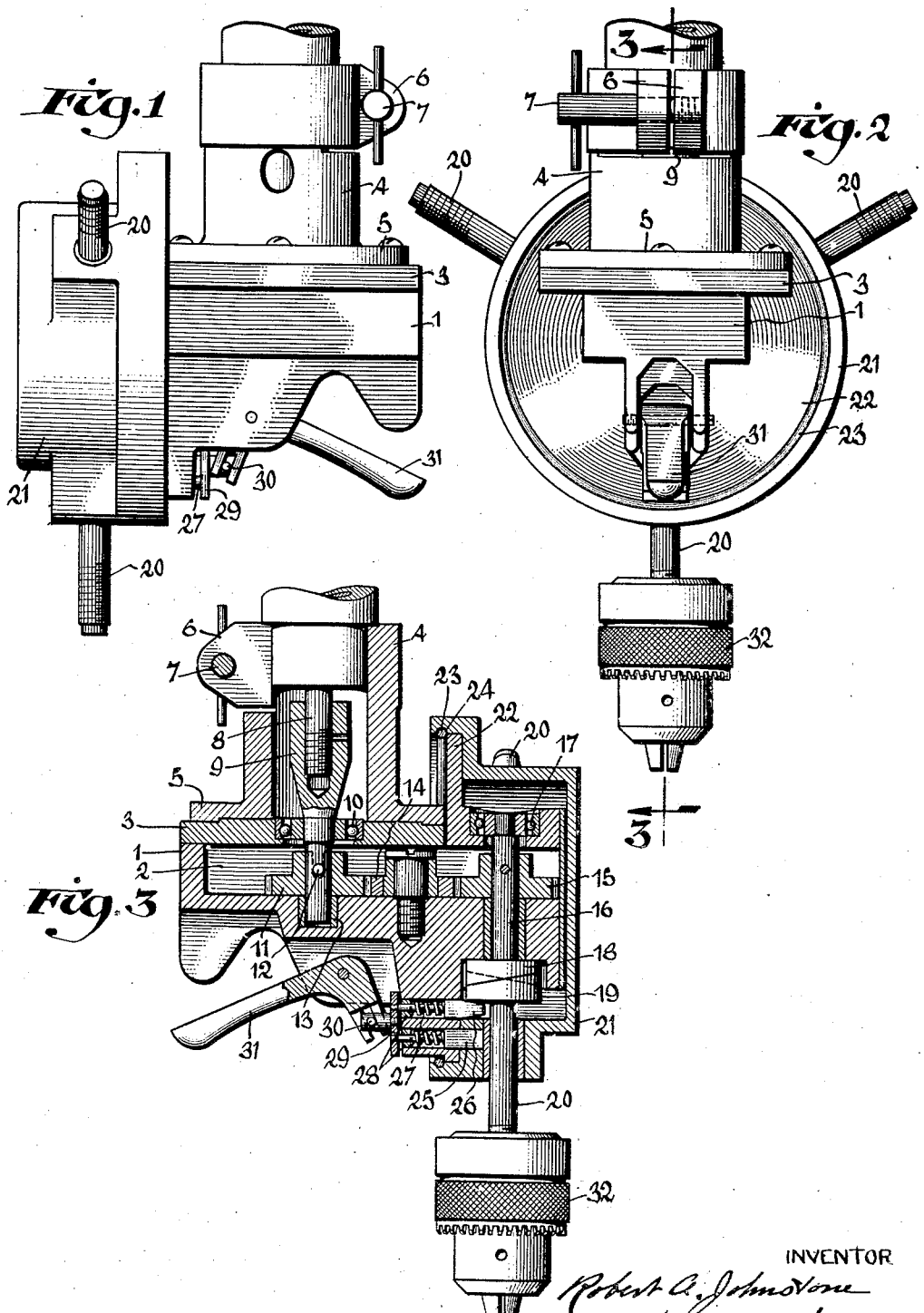

2,322,450

UNITED STATES PATENT OFFICE 2,322,450

MULTIPLE SPINDLE TURRET ATTACHMENT FOR MACHINE TOOLS AND THE LIKE

Robert A. Johnstone, Aurora, Ind.

Application July 9, 1941, Serial No. 401,679

4 Claims. (Cl. 29—57)

This invention relates to improvements in a multiple spindle turret head for attachment to the spindle of a machine tool, and particularly to the spindle of a portable power or hand driven tool.

An object of the invention is to provide an attachment of the character indicated, which is of durable construction, convenient in operation, and whereby the various tools carried by the turret can be selectively and quickly brought into a working position and in driven connection with the main spindle.

More specifically, an object is to provide a turret attachment for a power or hand driven tool attachable to the spindle journalling casing sleeve thereof, and carrying a plurality of radially extending tool holding spindles, each when in an active or operative position, disposed in a plane in parallelism with the main spindle, and each spindle when in its operative position connecting with the main driving spindle through a gear transmission.

Further advantages and features of the invention will be more fully set forth in a description of the accompanying drawing, in which:

Figure 1 is a side elevation of the improved turret head.

Figure 2 is a rear elevation of the same.

Figure 3 is a section on line 3—3, Figure 2.

Referring to the drawing, the turret head consists of a relatively stationary casing 1, interiorly providing a gear chamber 2, with a portion thereof at the upper side closed by a cover and journal plate 3 fixed to the casing. The journal plate has its relative opposite ends projecting beyond the casing and provides a support for a clamp sleeve 4. The clamp sleeve or socket 4 has an annular flange 5 for seating upon the plate 3, and secured thereto by a series of bolts or other appropriate fastening means. The sleeve longitudinally at its upper end is split and provided with a pair of adjoining clamping ears 6, 6, traversed by a hand bolt or stud 7 for compressing the sleeve and frictionally engaging the same upon the end of a housing or casing sleeve of the power or hand driven hand tool which journals the main spindle 8 as a means for conveniently and readily attaching the turret to the hand tool or tool carrying head of a machine tool.

A transmission coupling spindle 9 is screw-threaded upon the end of the main spindle 8 and intermediately is journalled in an anti-friction bearing 10 seated within a recess in the journal plate 3. The coupling spindle 9 traverses a gear 11 in the gear chamber. The gear 11 is fixed to the spindle by a pin 12 engaged within a radial slot in the hub of the gear. The lower end of the coupling spindle is engaged into and journals within a bearing bushing 13 seated within the casing 1. The gear 11 is in mesh with an intermediate gear 14 within the gear chamber 2, and said intermediate gear 14 in turn meshes with a driven gear 15 fixed upon a shaft 16 journalled within the casing 1.

The upper end of the shaft 16 is preferably journalled in an anti-friction bearing 17, seated within a recess in the casing 1. The lower end of the shaft 16 carries a clutch member 18 cooperating with a corresponding clutch member 19 fixed upon the upper or inner end of a driven spindle 20 as one of a plurality of spindles with which the turret is provided.

The main spindles 20 for the number provided, in the present instance limited to 3, are radially disposed and journalled in a hollow carrier 21, which serves as an end closure for the casing 1, and is rotatably supported upon an annular flange 22 of and projecting from the casing 1. The carrier is sustained upon the casing flange 22 by a split ring 23 recessed within an annular groove in the flange 24 of the carrier 21. Each driven spindle 20 with its clutch element 19 is movable radially within its bearing in the carrier 21 to permit the clutch element or member to be moved into and out of a clutching engagement with the clutch element or member 18 when in registry therewith, and also to clear the annular end portion of the casing 1 over which the spindle carrier is engaged.

The casing 1 is provided with a pair of spring-urged detents or lock pins 25, 26, adjoiningly arranged, one for locking the carrier 21 against rotation, and the second for confining a clutch member 19 in intermesh with the clutch element 18 when in registration. As shown, the detent 25 is adapted to engage into an aperture in the carrier 21 when a driven spindle is in registration or alignment with the driven shaft 16, the carrier being provided with a series of definitely located apertures, one for each of the number of multiple spindles with which the carrier is equipped. The second detent 26 has a tapered forward end, and is projected to engage beneath a clutch member 19 to hold the same in clutching connection with the clutch member 18.

Each detent is provided with a stem 27 respectively traversing a collar 28 in the outer end of a bore in the casing 1 in which the detent is slidably mounted, and each stem is fixed to a connecting cross head 29 carrying a stud 30 engaging with a forked end of an arm of a finger actuated trip lever 31 pivotally mounted within the casing 1. Thus, upon depressing the trip lever 31, the detents are withdrawn from their locking connection with the carrier and relative clutch member of the series, permitting the carrier to be rotated for bringing a second spindle into operative position.

The outer end of each driving spindle 20 is shown as threaded to receive a tool holding chuck 32. The chuck may be of any standard type, and is merely represented as one form or method for applying a tool to the driven spindle. The driven spindles in a spaced relation extend radially from the casing, and when locked in an operative position, are unidirectional with the main spindle so as to function in a manner substantially as when a tool is mounted upon the main spindle.

The turret as an attachment is readily applicable to a conventional electric motor driven hand tool, and a change from one tool to a second for the number carried by the turret can be readily made. The driving spindles are illustrated for the application of a tool holding chuck, but it is obvious that they may be of a form as provided with a tapering socket for direct application of a cutting or like tool.

Having described my invention, I claim:

1. A turret attachment for a machine tool, power driven hand tools and the like, comprising: a turret stock having a clamp sleeve for application of the stock to the end of a spindle support of the machine tool, a pair of parallel shafts in gear connection, journalled in said stock, one constituting a driving shaft and the second a driven shaft, the driving shaft accessible from within said clamp sleeve for coaxially coupling with the spindle of the machine tool, a turret head rotatably mounted on said stock and about said driven shaft and journalling a plurality of radially extending spindles adapting the spindles to be selectively brought into a coaxial position with said driven shaft and into coupling connecting therewith and means for locking the turret head against rotation with a selected one of the spindles thereof in registration with said driven shaft.

2. A turret attachment for a machine tool, power driven hand tools and the like, comprising: a turret stock applicable to the end of a spindle support of the machine tool, a pair of parallel shafts in gear connection, journalled in said stock, one constituting a driving shaft and the second a driven shaft, the driving shaft arranged for coupling with the spindle of the machine tool, a turret head rotatably mounted on said stock and about said driven shaft, journalling a plurality of radially extending spindles each adapted to be selectively brought into coaxial position with said driven shaft, and means for locking the turret head against rotation with a selected one of the spindles thereof in registration with said driven shaft, and simultaneously therewith coupling the turret spindle to said driven shaft.

3. A turret attachment for a machine tool, power driven hand tools and the like, comprising: a turret stock applicable to a spindle support of the machine tool, a pair of parallel shafts journalled in said stock and in gear connection within said stock, one constituting a driving shaft and second a driven shaft, the driving shaft adapted for endwise connection with the spindle of the machine tool, a turret head rotatably mounted on said stock about said driven shaft and an axis transverse to said driven shaft and journalling a plurality of radially extending spindles adapting each spindle to be selectively brought into a coaxial position with said driven shaft for a coupling connection therewith, a shaft coupling element upon one end of said driven shaft for cooperation with a relative coupling element respectively upon said turret spindles and means for locking the turret head against rotation with a selected one of the turret spindles thereof in registration with said driven shaft, and for moving its coupling element in coupling connecting with the coupling element of said driven shaft.

4. A turret attachment for a machine tool, power driven hand tools and the like, comprising: a turret stock applicable to a spindle support of the machine tool, a pair of parallel shafts journalled in said stock and in gear connection, one constituting a driving shaft and second a driven shaft, the driving shaft arranged for connection with the spindle of the machine tool, a turret head rotatably mounted on said stock about said driven shaft and an axis transverse to said driven shaft and journalling a plurality of radially extending spindles adapting each spindle to be selectively brought into a coaxial position with said driven shaft for a coupling connection therewith, each turret spindle having a clutch element fixed upon one end thereof within the stock, said driven shaft having a clutch element for coupling with the clutch element of a turret spindle when in a working position, and means for locking the turret head to the stock and confining a spindle clutch element in cooperation with the clutch element of said driven shaft.

ROBERT A. JOHNSTONE.